Sept. 26, 1967  E. JERMUNDSON  3,343,278
EDUCATIONAL GAME DEVICES
Filed Oct. 18, 1965  2 Sheets-Sheet 1
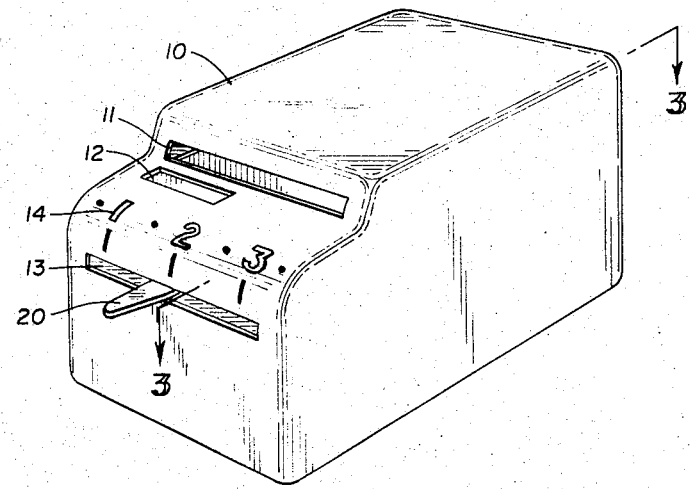
Fig_1
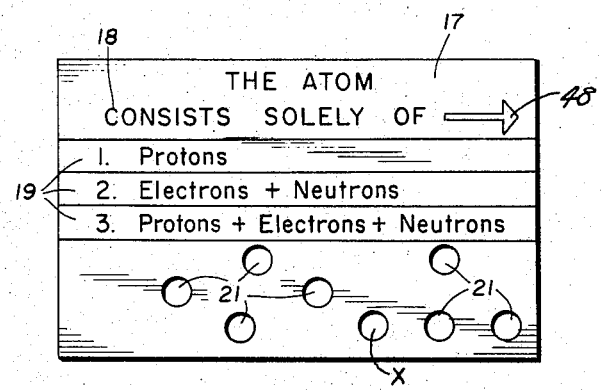
Fig_2
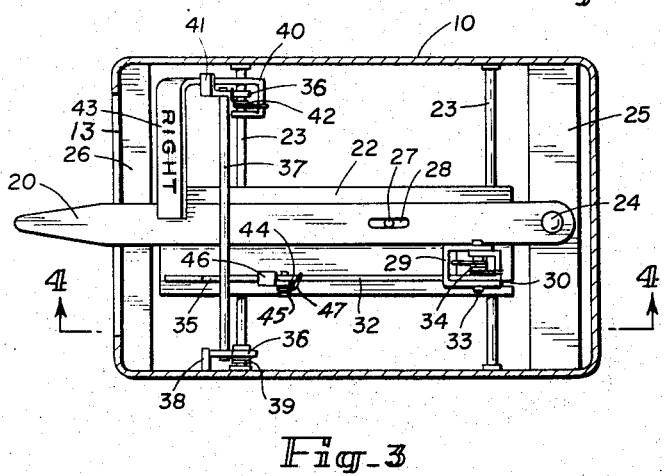
Fig_3
INVENTOR.
ERLING JERMUNDSON
BY
ATTORNEY

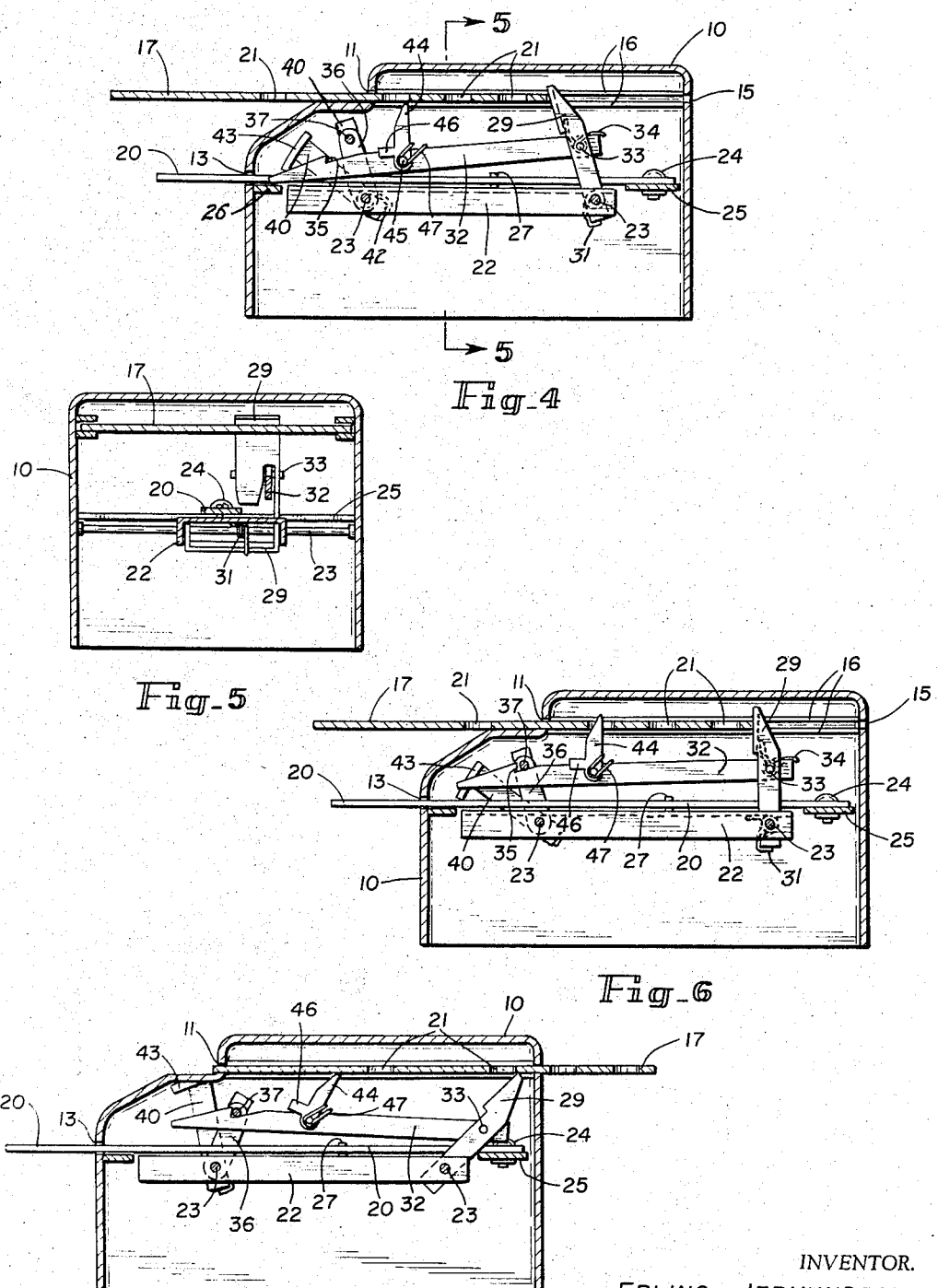

United States Patent Office 3,343,278
Patented Sept. 26, 1967

3,343,278
EDUCATIONAL GAME DEVICES
Erling Jermundson, 11971 Quay St.,
Broomfield, Colo. 80020
Filed Oct. 18, 1965, Ser. No. 496,860
3 Claims. (Cl. 35—9)

ABSTRACT OF THE DISCLOSURE

A feeler finger is resiliently urged upwardly against the bottom of a punched card containing a question and plurality of answers. A manually actuated selector lever positions the finger in selected paths of holes in the card. If the user places the lever in the proper correct answer path, the finger will engage a hole in the card as the latter is passed through the mechanism to actuate a visual indication that the correct answer has been selected.

---

This invention relates to an educational game device and has for its principal object the provision of a device into which question and answer cards may be inserted with a supposedly correct answer noted thereon and which will instantly indicate whether the submitted answer is correct.

Another object of the invention is to provide a device for the above purpose which: can be easily carried in the hand; will require no more dexterity than the simple insertion of a card; will not require batteries or other source of power; and which will operate automatically upon receipt of a question card.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views of the drawings and throughout the description.

In the drawings:

FIG. 1 is a perspective view of the game device of this invention;

FIG. 2 is a face view of a question card as employed for actuation of the game device;

FIG. 3 is a horizontal cross-section of the device looking downwardly on the line 3—3, FIG. 1;

FIG. 4 is a longitudinal section taken on the line 4—4, FIG. 3;

FIG. 5 is a cross section taken on the line 5—5, FIG. 4; and

FIGS. 6 and 7 are longitudinal sections similar to FIG. 4 showing intermediate positions of the internal mechanism to be later described.

The device is enclosed in a suitable outer case 10, the front of which is provided with a card entry slot 11, an indicating window 12, and a lever slot 13 along which a plurality of selection numbers 14 appear. A card exit slot 15 is formed in the back of the case in horizontal alignment with the entry slot 11. The sides of the case 10 are each provided with a pair of internally spaced ridges 16 for engaging the opposite side edges of a question card 17, such as shown in FIG. 2, to support and guide the card horizontally through the case 10 from the front entry slot 11 to the rear exit slot 15.

The question cards 17 are preprinted in sets relating to any desired scientific or educational subject and each card contains a question or statement 18 and a plurality of numbered replies or answers 19, as shown in FIG. 2. The user mentally selects the numbered reply 19 which he believes correctly replies to the question or statement 18 and positions a selector lever 20, which projects forwardly from the slot 13, in alignment with the selection number 14 corresponding to the number of the answer he has mentally selected. For instance, if he believes that the answer "2" is correct, he will move the lever 20 along the slot 13 until it aligns with the "2" on the case 10. He will then insert the card in the slot 11, in the direction of the arrow 48 in FIG. 2, and will push the card into the case 10 until it uncovers the window 12 and projects rearwardly from the case, as shown in FIG. 7. If he has selected the correct answer, the word "RIGHT," or any similar word will appear in the window 12. If his selection was incorrect there will be no appearance in the window.

As illustrated, the device and the cards show three answers. Both could be made to handle more or less answers, as desired, without altering the principle of operations. The cards are perforated, that is, provided with punch holes 21, there being a horizontal row of holes for each of the numbered answers 19.

The mechanism employs an inverted, channel-shaped carriage member 22 which can be shifted transversally of the case 10 along two fixedly mounted slide rods 23 by actuation of the selector lever 20. The selector lever is pivoted at its rear extremity, as shown at 24, upon a rear frame member 25 and extends forwardly over the carriage member and over a front cross frame member 26 below the lever slot 13. Transverse movement is transmitted to the carriage member by means of a connecting pin 27 which extends upwardly from the carriage member through an elongated, longitudinally-extending, pin slot 28 in the selector lever 20.

An actuating arm 29 is pivoted on the rear slide rod 23 within a guide slot 30 in the carriage member 22 and extends upwardly, and normally forwardly, to a position above the plane of the card guide ridges 16. The arm 29 is constantly urged forwardly on the carriage member, toward the position of FIG. 4, by means of a suitable coil spring 31. A pull bar 32 is pivotally mounted on a hinge pin 33 carried by the arm 29 above the rear slide rod 23.

The pull bar 32 extends forwardly from the hinge pin 33 and its forward extremity is resiliently urged downwardly toward the carriage member by means of a second suitable coil spring 34 positioned about the hinge pin 33. A ratchet-like notch 35 is formed in the upper edge of the pull bar 32 adjacent the forward extremity of the latter. The notch 35 is positioned so that, when the pull bar is actuated, rearwardly and upwardly, the notch will engage a swinging rod 37.

The swinging rod 37 is affixed to, and extends between the outer extremities of two side arms 36, the inner extremities of which are rotatably mounted upon the forward slide rod 23 so that when the swinging rod is engaged by the notch 35, the two side arms 36 and the rod 37 will be swung rearwardly. The arms 36 and the rod 37 are constantly urged forwardly against a stop element 38 by means of a third coil spring 39 which is wrapped about the forward slide rod 23 and engages one of the side arms 36.

An indicator arm 40 is also rotatably mounted on the forward slide rod 23 adjacent one of the other side arms 36 and is constantly and resiliently urged rearwardly toward a stop 41, formed on the latter arm, by means of a fourth coil spring 42 which surrounds the slide rod 23 and reacts between the indicator arm 40 and the side arm 36. The indicator arm 40 is bent inwardly at its outer extremity to form an indicating plate 43 carrying the word "RIGHT," or a word of similar meaning, which, when the indicator arm 40 is rotated upwardly and rearwardly, will appear in the window 12.

A movement limiting finger 44 is pivotally mounted on a pivot pin 45 on the pull bar 32 and is constantly urged forwardly against a stop element 46 by a fifth coil spring 47 which surrounds the pin 45. The stop element 46 is so positioned that it will stop the finger 44 when the latter is in the vertical position as shown in FIGURE 4.

*Operation*

Let us assume that the user has assumed that answer "3" on the card 17 is correct. He moves the selector lever to "3" in the slot 13 and places the card in the slot 11 and forces it rearwardly. The initial contact between the leading edge of the card and the actuating arm 29 swings the latter rearwardly to elevate the forward extremity of the pull bar 32 and its finger 44. If, at this initial instant, one of the punch holes 21 is over the finger 44 the finger will pass upwardly through the hole in the card to allow the pull bar 32 to move upwardly into resilient contact with the swinging rod 37 as shown in FIG. 6.

Continued rearward movement of the card now draws the pull bar 32 rearwardly in sliding contact beneath the swinging rod 37 until the ratchet notch 35 engages the rod 37 and then draws the rod 37 and the indicating plate 43 rearwardly until the word "RIGHT" thereon appears in the window 12 and the plate 43 engages the top edge of the window 12.

The rearward movement is still continued, the side arm 36 moving away from the stopped indicating arm 40 under the bias of the fourth coil spring 42, and the finger 44 tilting rearwardly, under the bias of the fifth coil spring 47, as shown in FIG. 7. The indicating word "RIGHT" is now exposed in the window and the card can be withdrawn from the rear exit slot 15 allowing the mechanism to resiliently return to the position of FIG. 4.

Therefore, actuation of the indicating plate depends upon there being a punch hole, in the line chosen by the selector lever 20, at an exact predetermined distance from the leading edge of the card such as the hole indicated at "X" in FIG. 2. If there is no punch hole in the chosen line at the exact distance of the hole "X," the finger 44 will engage the bottom of the card at the position of the missing hole so as to prevent the pull bar from rising a sufficient distance to engage the swinging rod 37 and the indicating mechanism will remain inactive throughout the passage of the card.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. An educational game device comprising:
    (a) a card having a statement and a plurality of numbered replies to the statement printed thereon and a plurality of holes punched therein;
    (b) an outer case having an entry slot for receipt of said card, an exit slot for the discharge of said card and an indicating window;
    (c) means in said case, instigated and actuated solely by the movement of said card through said case from the entry slot to the exit slot, to position a specific indication in said window when one of the holes in said card moves into a predetermined position in said case.

2. An educational game device, adapted to be actuated by insertion of a perforated card comprising:
    (a) an enclosing case having a card receiving slot, a card discharging slot, an indicating window, and provided with card guiding means for supporting and guiding the card longitudinally through said case from the first to the second slot;
    (b) slide rods extending transversally across said case below said card guiding means;
    (c) a carriage member slidably mounted on said slide rods so as to be movable transversally of said case;
    (d) a movable information element adapted, when actuated to display information through said indicating window;
    (e) card engaging means carried by said carriage element and adapted to engage a card supported on said card guiding means and to actuate said information element in consequence of the passage of a specific perforation in said card; and
    (f) means for shifting said carriage member laterally to preset the longitudinal track of said card engaging means along said card.

3. An educational game device as described in claim 2 in which the card engaging means comprises:
    (a) an actuating arm pivoted on and extending upwardly from said carriage member into the path of said card so as to be engaged and swung rearwardly by the leading edge of said card;
    (b) an elongated pull bar pivoted upon and extending forwardly from said actuating arm and adapted to be resiliently swung upwardly by the rearward movement of said actuating arm;
    (c) a finger element extending upwardly from said pull bar so as to move upwardly toward the card in consequence of the upward swing of said pull bar; and
    (d) means for connecting said pull bar to said information element in consequence of the finger element passing through a perforation in said card during the upward movement of said finger element.

References Cited

UNITED STATES PATENTS 2,760,274    8/1956    Baker _____ 35—9
3,127,176    3/1964    Ryan _____ 35—9

EUGENE R. CAPOZIO, *Primary Examiner.*

R. W. WEIG, *Assistant Examiner.*